United States Patent
Bishop et al.

(10) Patent No.: US 6,356,377 B1
(45) Date of Patent: Mar. 12, 2002

(54) MEMS VARIABLE OPTICAL DELAY LINES

(75) Inventors: David John Bishop, Summit; Randy Clinton Giles, Whippany, both of NJ (US)

(73) Assignees: Agere Systems Guardian Corp., Miami Lakes, FL (US); Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/515,999

(22) Filed: Feb. 29, 2000

Related U.S. Application Data

(60) Provisional application No. 60/164,458, filed on Nov. 10, 1999.

(51) Int. Cl.[7] .......................... G02B 26/00; G02B 1/29; G02B 6/26
(52) U.S. Cl. ...................... 359/290; 359/237; 359/318; 385/25
(58) Field of Search ................................. 359/290, 237, 359/317, 318; 385/25, 27, 33, 16

(56) References Cited

U.S. PATENT DOCUMENTS

| 4,733,928 A | 3/1988 | d'Auria et al. ........... 350/96.15 |
| 5,033,853 A | 7/1991 | Frangineas, Jr. ............ 356/346 |
| 5,066,088 A | * 11/1991 | Davies et al. .................. 385/25 |
| 5,220,463 A | 6/1993 | Edelstein et al. ........... 359/857 |
| 6,155,490 A | * 12/2000 | Ackley .................. 235/472.01 |

FOREIGN PATENT DOCUMENTS

EP   0 902 538 A2   3/1999

* cited by examiner

*Primary Examiner*—Georgia Epps
*Assistant Examiner*—Tim Thompson

(57) ABSTRACT

A variable optical delay line using MEMS devices. A reflector on a micro machine linear rack is positioned and spaced from an input source and/or an output to receive and reflect input light waves toward the output. The distance between the reflector and the input and output is variable and thereby enables selective path delay compensation of the input light wave signals. Other disclosed embodiments utilize pivoting MEMS mirrors and selective adjustment of the mirror pivot angles to provide the selective path delay compensation required in a light wave system.

12 Claims, 2 Drawing Sheets

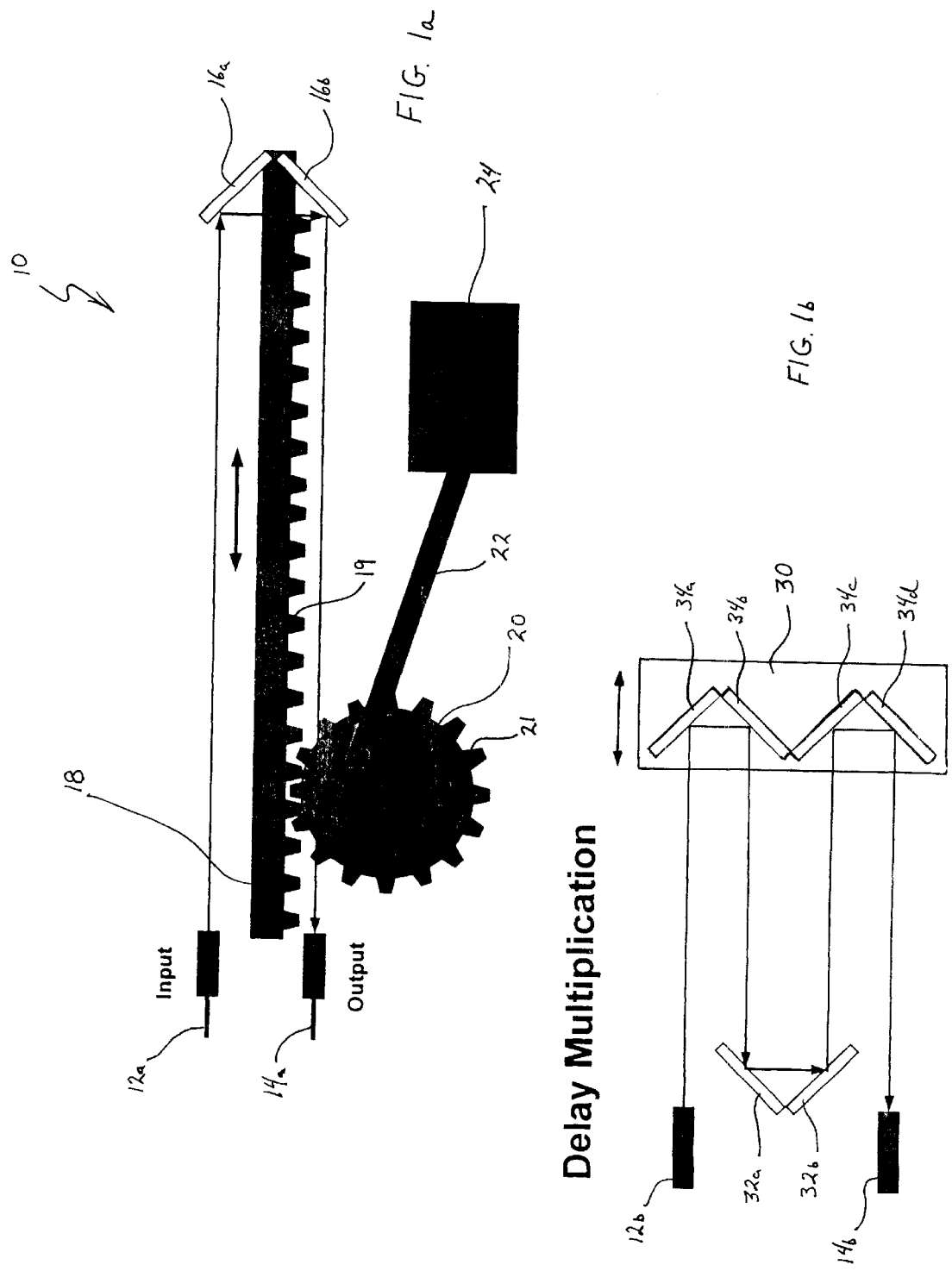

MEMS VARIABLE OPTICAL DELAY LINES

RELATED APPLICATIONS

This application claims priority from provisional application Ser. No. 60/164,458, filed on Nov. 10, 1999.

BACKGROUND OF THE INVENTION

1. Field of the Invention

The present invention relates to micro electromechanical systems (MEMS) devices and, more particularly, to a MEMS apparatus that compensates for signal path delay in optical systems.

2. Description of the Related Art

Advanced optical (light wave) systems generally include some sort of compensation in the transmitting and/or receiving of information through optical lines. Some examples of this are compensation of polarization mode dispersion (PMD) and optical pulse timing in wavelength-division multiplexed and optically time-division multiplexed (OTDM) transmitters. In such applications, small adjustments (equivalent to several bit periods in PMD compensators and a single bit-period in OTDM transmitters) in the optical path lengths are needed in order to compensate for signal path delay. For example, in a 40 Gb/s data rate system, the 25 ps bit period has a corresponding free space bit length of $cT=7.5$ mm.

As the bit speeds at which data and information are transferred increases in optical systems such as these, so does the propagation delay. Even in systems having fixed delay elements, the path delay changes (in small amounts). This path delay can be caused, for example, by the effect of the coefficient of thermal expansion as the temperature of the respective optical transmission lines changes.

Conventional variable optical delay lines are comprised of a motor driven linear translation stage that moves a retroreflector to change the path length from the input to the output. Digitally settable optical fiber delay lines can be made using optical switches to select different sections of optical fiber. Equivalent functions can also be obtained in integrated optical devices. Some of the drawbacks of these delay compensation systems include high power requirements, high cost, large physical size and slow speed.

The use of micro-machines or micro electromechanical systems (MEMS) devices is becoming increasingly preferred in the optical transmission field. This preference is a result of several advantages that MEMS devices offer over the components of existing systems, including small size, fast response time and low power consumption. Thus, it would be particularly advantageous to implement a variable optical delay line using MEMS devices.

SUMMARY OF THE INVENTION

It is therefore an object of the present invention to provide a MEMS variable optical delay line that overcomes and eliminates all of the drawbacks of prior art systems.

In is another object of the present invention to provide a MEMS variable optical delay line that can function as a variable attenuator, tunable optical filter, and optical switch.

These and other objects are achieved in accordance with an embodiment of the invention wherein the micro electromechanical (MEMS) variable optical delay line includes an input for receiving a light wave signal and an output adapted to provide a delay path compensated light wave signal. A micro machine linear rack has a reflector spaced from the input and output at a predetermined distance to receive the input light wave signal and reflect it towards the output. The distance between the reflector and the input and/or output is selectively variable in accordance with the predetermined amount of delay path compensation that is required. A controller connected to the micro machine linear rack is adapted to selectively control the distance between the reflector and the input and/or output in accordance with the required predetermined amount of delay path compensation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIG. 1a is a schematic plan view of a MEMS variable optical delay line according to an embodiment of the invention;

FIG. 1b is a schematic plan view of a modified embodiment of the MEMS variable optical delay line according to the invention;

DETAILED DESCRIPTION OF THE PRESENTLY PREFERRED EMBODIMENTS

Figure 2B:
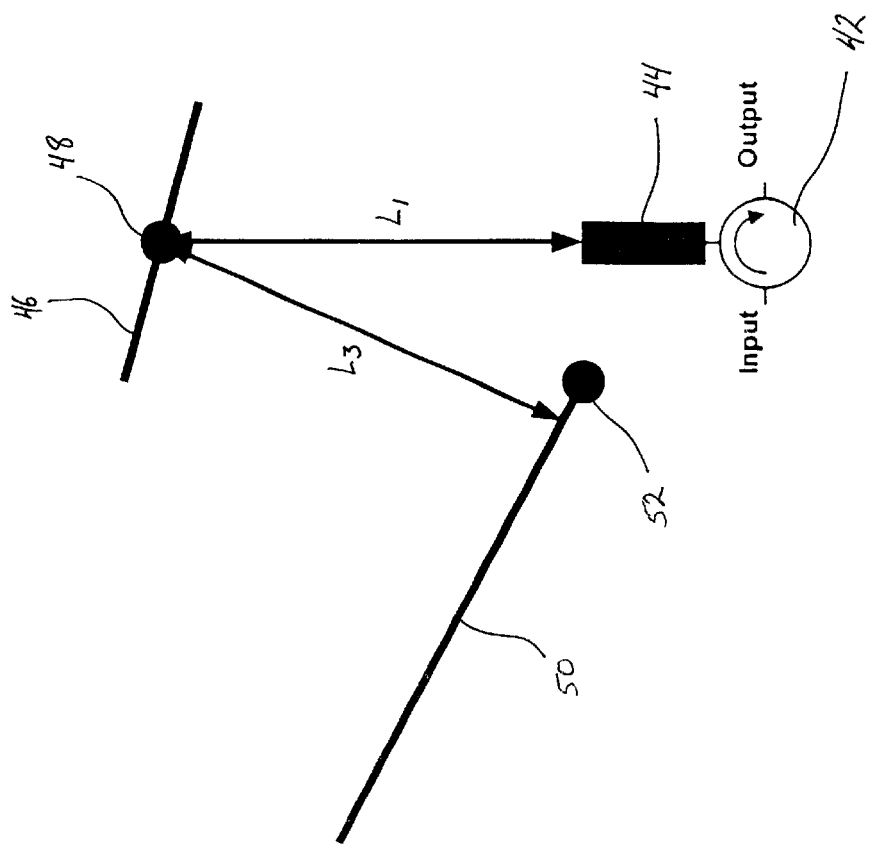
FIG. 2b is a schematic plan view of the MEMS variable optical delay line of FIG. 2a in a long path configuration.

FIG. 1a shows a MEMS variable optical delay line 10 having an input waveguide or fiber 12a and an output waveguide or fiber 14a. A micro retroreflector defined by two mirrors 16a and 16b are arranged on a micro machine linear rack 18 so that the light wave transmitted from input 12a is reflected back into output 14a. The micro machine linear rack 18 can be, for example, a silicon micro machine linear rack which is operatively capable of several millimeters of travel.

The micro machine linear rack includes gears 19 which mesh with the gears 21 of a drive gear 20. Drive gear 20 is rotatively driven by a drive arm 22 connected to a drive motor 24. Drive motor 24 is preferably connected to a computer controller (not shown) which provides control signals to the motor to effect desired movement of linear rack 18 and thereby variably control the length of the signal path between the input 12a and output 14a. Such selective variation of the distance between the micro machine retroreflector formed by mirrors 16a and 16b and the input 12a and output 14a fibers can be used to compensate for signal path delay losses in the transmission.

FIG. 1b depicts another embodiment of a MEMS variable optical delay line in accordance with the present invention. In this embodiment, the signal path of the delay line is extended by using a double pass retroreflector 30 and a fixed mirror stage formed of mirrors 32a and 32b. The extension of the signal path of the delay line can, however, result in an increase in signal loss, attributable to diffraction and mirror distortion in the mirrors 32a, 32b and 34a–34d, thereby limiting the maximum mirror excursion and number of path folds. For example, a 100 μm mirror dimension and total path length of 1 cm may result in an approximate signal loss of 4 dB. In order to improve such loss characteristic, one of ordinary skill will recognize that other imaging optics such as non-plane reflectors may be used in place of the various planar mirrors, and other adaptive optics may be used at the input 12a and/or output 14b, respectively. Collimating and receiving optics are integrated with the input 12a and output 14a so as to enable coupling of the delay compensated light wave into the optical fiber.

Optical detectors and sources could also be incorporated to monitor and control the performance of the delay line, including insertion loss and delay time. One of ordinary skill will further recognize that the micro machine delay line may also simultaneously act as a variable attenuator.

Figure 2A:
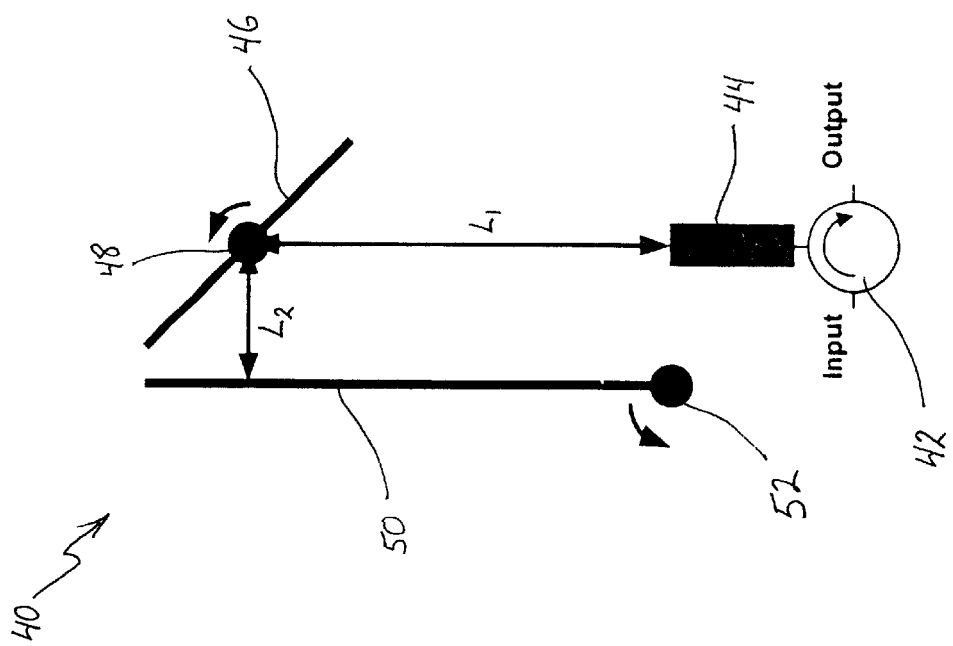
FIG. 2a is a schematic plan view of a MEMS variable optical delay line according to yet another embodiment of the invention in a short path configuration.

FIGS. 2a and 2b show another embodiment of a variable optical delay line 40 using mirrors. These mirrors may be MEMS mirrors or any other suitable known pivotable mirror. Referring to FIG. 2a, the light wave is provided to the delay line 40 through an optical circulator 42. When optical circulator 42 is positioned at the input stage, the light wave travels out of the fiber 44 and is directed to a first pivoting mirror 46 movable about a pivot point 48. The first pivoting mirror 46 pivots to scan the reflected beam along the length of a second mirror 50. The second mirror 50 pivots at one end 52 to adjust its reflected beam to return to the input port (via first mirror 46) where the optical circulator 42 is used to remove the output beam. Those of ordinary skill will recognize that other imaging schemes can similarly be employed to direct the output beam to a separate port, thereby eliminating the need for the optical circulator 42.

As depicted in FIG. 2a, the combined distances of travel between the fiber 44 and mirror 46 ($L_1$), and between first mirror 46 and second mirror 50 ($L_2$), determine the length of delay compensation selectively provided by the delay line 40. As perhaps best seen in FIG. 2b, by pivoting the first and second mirrors 46 and 50, respectively, the length $L_3$ between mirror 46 and mirror 50 is extended, thereby increasing the amount of delay compensation that is provided. It is therefore apparent that the selective pivoting of mirrors 46, 50 can advantageously result in an infinite number of values of delay line compensation within a predetermined range for this delay line.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A micro electromechanical variable optical delay line, comprising:

an input for receiving and inputting to the delay line an input light wave;

an output adapted to receive and output from the delay line an output path delay compensated light wave signal;

a micro machine linear rack having a reflector spaced from the input at a distance to receive the input light wave signal and to reflect the received light wave signal towards said output, wherein the distance is selectively variable in accordance with a predetermined path delay compensation to be provided by the optical delay line; and a controller connected to said micro machine linear rack and operable to selectively vary and thereby control the distance between said reflector and said input in accordance with the predetermined path delay compensation; said controller having a drive motor;

an arm having one end connected to said drive motor and an opposing end; and a gear connected to said opposing end of the arm and operatively engaged with said micro machine linear rack such that actuation of the motor causes said arm to drive said gear to move micro machine linear rack and thereby vary the distance between the input and the reflector to correspond to achieve the predetermined path delay compensation.

2. The micro electromechanical variable optical delay line according to claim 1, wherein said reflector comprises a first mirror and a second mirror mounted on said micro machine linear rack, said first mirror being adapted to receive the input light wave from said input and to reflect the received input light wave toward said second mirror, and said second mirror being adapted to further reflect the reflected light wave signal from the first mirror toward said output.

3. The micro electromechanical variable optical delay line according to claim 1, wherein said reflector comprises:

a movable mirror stage disposed for movement with the micro machine linear rack; and a fixed mirror stage disposed in a fixed position relative to and against movement with the micro machine linear rack, wherein said movable mirror stage and said fixed mirror stage cooperate to reflect the input light wave received from said input toward said output in accordance with the predetermined path delay compensation.

4. The micro electromechanical variable optical delay line according to claim 1, wherein said reflector comprises a MEMS mirror.

5. A micro electromechanical variable optical delay line comprising:

an input adapted to receive input light wave signals;

an output for receiving and outputting path delay compensated light wave signals produced by the optical delay line;

a first pivoting mirror positioned a predetermined distance from the input and adapted to receive from the input and to reflect the received input light wave signals in a predetermined direction; and a second pivoting mirror positioned with respect to said first pivoting mirror so as to receive the reflected light wave signals from the first pivoting mirror and to reflect the received reflected light wave signal from the first pivoting mirror toward said output, wherein selectively controlled pivoting of said first and second mirrors selectively controls path delay compensation of the input light wave signals to produce at the output the path delay compensated light wave signals.

6. The micro electromechanical variable optical delay line according to claim 5, wherein said first and second pivoting mirrors comprise MEMS mirrors.

7. The micro electromechanical variable optical delay line according to claim 5, further comprising an optical circulator adapted to switch between said input and said output and thereby provide a single light wave signal connection to the optical delay line.

8. The micro electromechanical variable optical delay line according to claim 5, wherein said second pivoting mirror is positioned such that selective pivotal movement of the second mirror changes a distance defined between said first and second mirrors and thereby enables selective variable path delay compensation of the input light wave signals.

9. A micro electro-mechanical variable optical delay line, comprising:

an input for receiving and inputting to the delay line an input light wave;

an output adapted to receive and output from the delay line an output path delay compensated light wave signal;

a micro machine linear rack having a reflector spaced from the input at a distance to receive the input light wave signal and to reflect the received light wave signal towards said output, wherein the distance is selectively variable in accordance with a predetermined path delay compensation to be provided by the optical delay line, said reflector having a movable mirror stage disposed for movement with the micro machine linear rack and a fixed mirror stage disposed in a fixed position relative to and against movement with the micro machine linear rack, wherein said movable mirror stage and said fixed mirror stage cooperate to reflect the input light wave received from said input toward said output in accordance with the predetermined path delay compensation; and a controller connected to said micro machine linear rack and operable to selectively vary and thereby control the distance between said reflector and said input in accordance with the predetermined path delay compensation.

10. The micro electromechanical variable optical delay line according to claim 9, wherein said controller comprises:

a drive motor;

an arm having one end connected to said drive motor and an opposing end;

a gear connected to said opposing end of the arm and operatively engaged with said micro machine linear rack such that actuation of the motor causes said arm to drive said gear to move micro machine linear rack and thereby vary the distance between the input and the reflector to correspond to achieve the predetermined path delay compensation.

11. The micro electromechanical variable optical delay line according to claim 9, wherein said reflector comprises a first mirror and a second mirror mounted on said micro machine linear rack, said first mirror being adapted to receive the input light wave from said input and to reflect the received input light wave toward said second mirror, and said second mirror being adapted to further reflect the reflected light wave signal from the first mirror toward said output.

12. The micro electromechanical variable optical delay line according to claim 9, wherein said reflector comprises a MEMS mirror.

* * * * *